United States Patent
Tatsuta et al.

(10) Patent No.: US 9,977,249 B2
(45) Date of Patent: May 22, 2018

(54) SUPPORT MEMBER FOR WEARABLE DEVICE

(71) Applicant: OLYMPUS CORPORATION, Tokyo (JP)

(72) Inventors: Seiji Tatsuta, Tokyo (JP); Teruo Tomita, Tokyo (JP); Yoichi Iba, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days. days.

(21) Appl. No.: 15/494,987

(22) Filed: Apr. 24, 2017

(65) Prior Publication Data

US 2017/0227780 A1    Aug. 10, 2017

Related U.S. Application Data

(63) Continuation of application No. PCT/JP2014/083115, filed on Dec. 15, 2014.

(51) Int. Cl.
G06F 1/16 (2006.01)
H05K 5/00 (2006.01)
(Continued)

(52) U.S. Cl.
CPC .................................. G02B 27/028 (2013.01)

(58) Field of Classification Search
CPC ... G06F 1/163; G02B 27/0093; G02B 27/017; G02B 27/028
(Continued)

(56) References Cited

U.S. PATENT DOCUMENTS 5,589,846 A * 12/1996 Kobayashi ......... G02B 27/0176
340/980
5,986,813 A * 11/1999 Saikawa .............. G02B 27/017
359/630
(Continued)

FOREIGN PATENT DOCUMENTS

JP    H09-113860 A    5/1997
JP    2007-067497 A    3/2007
(Continued)

OTHER PUBLICATIONS

International Search Report dated Feb. 24, 2015 issued in PCT/JP2014/083115.

*Primary Examiner* — Anthony Haughton
(74) *Attorney, Agent, or Firm* — Scully, Scott, Murphy & Presser, P.C.

(57) ABSTRACT

A support member for a wearable device includes first and second contact portions coming into contact with a temporal region of a head, a frame portion interposed along a frontal region of the head between the first and second contact portions, and first and second connection portions respectively connecting the first and second contact portions and the frame portion to each other. In a top view, in the first connection portion, a first extension portion extending from the first contact portion and a first frame extension portion are branched ahead of an ear from the frame portion, and in the second connection portion, a second extension portion extending from the second contact portion and a second frame extension portion are branched ahead of the other ear from the frame portion. At least one of the first and second frame extension portions includes a support portion supporting a wearable device.

9 Claims, 13 Drawing Sheets

(51) Int. Cl.
*H05K 7/00* (2006.01)
*G02B 27/02* (2006.01)

(58) Field of Classification Search
USPC ...... 361/679.03, 679.01, 679.02; 345/7, 8, 9
See application file for complete search history.

(56) References Cited

U.S. PATENT DOCUMENTS

| | | | |
|---|---|---|---|
| 8,384,618 B2* | 2/2013 | Karutz | G02B 27/0176 |
| | | | 345/8 |
| 8,971,023 B2* | 3/2015 | Olsson | G02C 5/12 |
| | | | 345/8 |
| 8,976,085 B2* | 3/2015 | Olsson | G09G 5/00 |
| | | | 345/7 |
| 9,703,119 B2* | 7/2017 | Cazalet | G02C 5/2236 |
| 9,759,917 B2* | 9/2017 | Osterhout | G02B 27/0093 |
| 2012/0081658 A1 | 4/2012 | Sugihara et al. | |
| 2012/0206323 A1* | 8/2012 | Osterhout | G02B 27/0093 |
| | | | 345/8 |

FOREIGN PATENT DOCUMENTS

| | | |
|---|---|---|
| JP | 2012-078588 A | 4/2012 |
| JP | 2013-088723 A | 5/2013 |
| JP | 2014-157192 A | 8/2014 |

* cited by examiner

SUPPORT MEMBER FOR WEARABLE DEVICE

This application is a continuation application of PCT Patent Application No. PCT/JP2014/083115, filed Dec. 15, 2014, the content of which is incorporated herein by reference.

BACKGROUND OF THE INVENTION

Field of the Invention

The present invention relates to a support member for fixing a wearable device to a user's head.

Description of Related Art

In recent years, it is known that a wearable device such as a head mount display and a wearable camera is utilized while a user wears the wearable device on his or her head. As a use application of the wearable device, it is conceivable to use the wearable device for work assistance in which a technician in a remote location gives an instruction to a worker present in a work site so as to carry out work requiring a technique. In this case, the worker often wears a helmet together with the wearable device. For example, Japanese Unexamined Patent Application, First Publication No. 2007-67497 discloses a mechanism for directly attaching an image display device to a portion of a cap body such as the helmet. In addition, Japanese Unexamined Patent Application, First Publication No. H9-113860 discloses a mounting mechanism for fixing a display device to the head using a U-shaped frame covering a frontal region and a temporal region of the head.

SUMMARY OF THE INVENTION

According to a first aspect of the present invention, a support member for a wearable device includes: a first contact portion that is configured to come into contact with a right or left temporal region of a head of a user; a second contact portion that is configured to come into contact with a right or left temporal region of the head which is different from that of the first contact portion; a frame portion that is configured to be interposed along a frontal region of the head of the user between the first contact portion and the second contact portion; a first connection portion that is configured to connect the first contact portion and the frame portion to each other; and a second connection portion that is configured to connect the second contact portion and the frame portion to each other. The first connection portion has a first extension portion which is configured to extend toward a front of the user from the first contact portion, and a first dividing portion which is configured to be located forward from an ear of the user and which is configured to connect the first extension portion and the frame portion to each other so as to form a first frame extension portion configured to extend toward a rear of the user from the frame portion, and in a top view, the first extension portion and the first frame extension portion each extend from the first dividing portion. The second connection portion has a second extension portion which is configured to extend toward the front of the user from the second contact portion, and a second dividing portion which is configured to be located forward from the ear of the user and which is configured to connect the second extension portion and the frame portion to each other so as to form a second frame extension portion configured to extend toward the rear of the user from the frame portion, and in the top view, the second extension portion and the second frame extension portion each extend from the second dividing portion. At least any one of the first frame extension portion and the second frame extension portion includes a support portion which is configured to support a wearable device.

According to a second aspect of the present invention, in the support member for the wearable device according to the first aspect, in a side view, the first extension portion and the first frame extension portion may each extend from the first dividing portion in the first connection portion. In the side view, the second extension portion and the second frame extension portion may each extend from the second dividing portion in the second connection portion. In this manner, the support member for the wearable device according to the present invention is disposed at a position which does not obstruct a view of the user, and easily avoids an ear string of a helmet.

According to a third aspect of the present invention, in the support member for the wearable device according to the first or second aspect, the first frame extension portion may be attachable to and detachable from the first dividing portion. The second frame extension portion may be attachable to and detachable from the second dividing portion. In this manner, after a user wears the support member for the wearable device and the helmet, the first frame extension portion and the second frame extension portion can be attached thereto. Accordingly, the user can wear the support member for the wearable device so that an ear string of the helmet is not disposed outside the first frame extension portion and the second frame extension portion.

According to a fourth aspect of the present invention, the support member for the wearable device according to any one of the first to third aspects may further include a third contact portion that is connected to the frame portion, and that is configured to come into contact with the frontal region of the head of the user. In this manner, the support member for the wearable device according to the present invention can be fixed using three points in the right and left temporal regions and the frontal region. Accordingly, more stable fixing is available.

According to a fifth aspect of the present invention, in the support member for the wearable device according to any one of the first to fourth aspects, in a state of wearing the support member, a center position in a longitudinal direction of each of the first contact portion and the second contact portion may be configured to be located rearward from the ear of the user. In this manner, the support member for the wearable device according to the present invention can be more stably fixed since three support points in total such as one point in the frontal region and two points rearward from the ear are disposed in a well-balanced manner.

According to a sixth aspect of the present invention, in the support member for the wearable device according to the fourth or fifth aspect, the third contact portion may be movable in a vertical direction. In this manner, the support member for the wearable device according to the present invention can be fixed in view of individual differences in a size of the user's head.

According to a seventh aspect of the present invention, the support member for the wearable device according to any one of the first to sixth aspects may further include an occipital region band that is attached to the first frame extension portion and the second frame extension portion, and that is configured to come into contact with the head along an occipital region of the head of the user. In this manner, the support member for the wearable device according to the present invention can be more stably fixed to the user's head.

According to an eighth aspect of the present invention, a support member for a wearable device includes: a first contact portion that is configured to come into contact with a right or left temporal region of a head of a user; a second contact portion that is configured to come into contact with a right or left temporal region of the head which is different from that of the first contact portion; and a frame portion that is configured to be interposed along a frontal region of the head of the user between the first contact portion and the second contact portion. The frame portion has a first dividing portion and a second dividing portion on respective end sides, the first dividing portion and the second dividing portion each being configured to be located forward from an ear of the user, and in a top view, two extension portions extend from each of the first dividing portion and the second dividing portion. One of the extension portions extending from the first dividing portion is connected to the first contact portion. One of the extension portions extending from the second dividing portion is connected to the second contact portion. At least any one of the other one of the extension portions extending from the first dividing portion and the other one of the extension portions extending from the second dividing portion includes a support portion which is configured to support a wearable device.

DETAILED DESCRIPTION OF THE INVENTION

Hereinafter, embodiments according to the present invention will be described. The respective embodiments described herein do not unreasonably limit the content disclosed in claims of the present invention. In addition, all of configurations described in the respective embodiments are not necessarily indispensable configuration requirements.

First Embodiment

Figure 1:
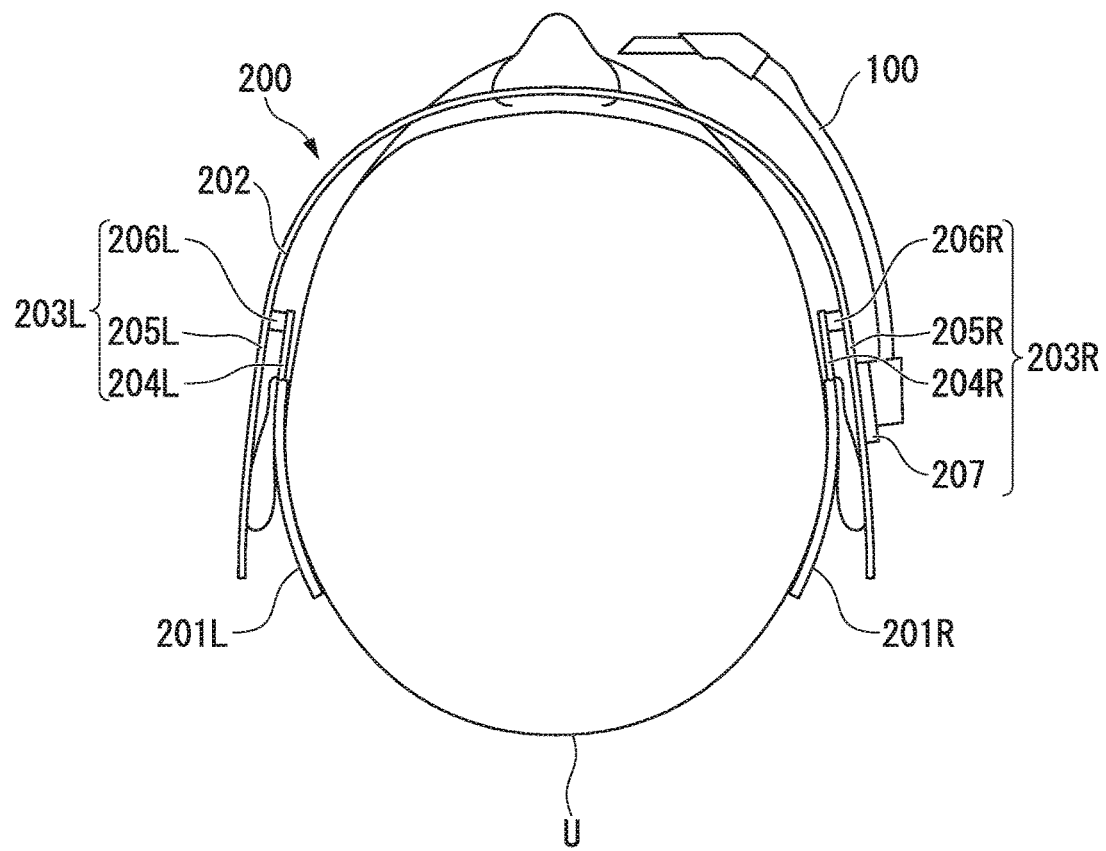
FIG. 1 is a top view illustrating a state where a user wears a support member for a wearable device according to a first embodiment.

FIG. 1 is a top view illustrating a state where a user U wears a support member 200 for a wearable device according to a first embodiment. In a wearing state of the user U, the support member 200 for the wearable device according to the present embodiment includes a first contact portion 201R which comes into contact with a right temporal region of the user U and which is configured of an elastic body such as rubber, a second contact portion 201L which comes into contact with a left temporal region of the user U and which is configured of an elastic body such as rubber, a frame portion 202 which is connected to the first contact portion 201R and the second contact portion 201L so as to be interposed therebetween along a frontal region of the user U and which is configured of an elastic resin or metal, and a support portion 207 which supports a wearable device 100 by attaching the wearable device 100 to the frame portion 202. In the wearing state of the support member 200 for the wearable device, the first contact portion 201R and the second contact portion 201L are biased by force acting in a direction toward a head of the user U, which is generated by elastic force of the frame portion 202. Thereby, the support member 200 for the wearable device is fixed to the head of the user U. The present embodiment employs a display device (near-eye display) 100 as the wearable device.

In addition, the support member 200 for the wearable device includes a first connection portion 203R which connects the first contact portion 201R and the frame portion 202 to each other, and a second connection portion 203L which connects the second contact portion 201L and the frame portion 202 to each other. Furthermore, the first connection portion 203R is configured of a first extension portion 204R which extends toward the front of the user U from the first contact portion 201R, and a first dividing portion 206R which is located forward from an ear of the user U and which connects the first extension portion 204R and the frame portion 202 to each other so as to form a first frame extension portion 205R extending toward the rear of the user U from the frame portion 202. As a result, in a top view, the first connection portion 203R is divided into two portions of the first extension portion 204R and the first frame extension portion 205R from the first dividing portion 206R, thereby forming a gap therebetween. In other words, a configuration is adopted in which the first extension portion 204R and the first frame extension portion 205R are connected to each other in only the first dividing portion 206R and in which the first extension portion 204R and the first frame extension portion 205R are gradually away from each other as both of these extend from the first dividing portion 206R toward the rear side of the user U. Similarly, the second connection portion 203L is configured of a second extension portion 204L which extends toward the front of the user U from the second contact portion 201L, and a second dividing portion 206L which is located forward from the ear of the user U and which connects the second extension portion 204L and the frame portion 202 to each other so as to form a second frame extension portion 205L extending toward the rear of the user U from the frame portion 202. As a result, in a top view, the second connection portion 203L is divided into two portions of the second extension portion 204L and the second frame extension portion 205L from the second dividing portion 206L, thereby forming a gap therebetween. In other words, a configuration is adopted in which the second extension portion 204L and the second frame extension portion 205L are connected to each other in only the second dividing portion 206L and in which the second extension portion 204L and the second frame extension portion 205L are gradually away from each other as both of these extend from the second dividing portion 206L toward the rear side of the user U.

The support portion 207 is disposed in at least any one of the first frame extension portion 205R and the second frame extension portion 205L. The support portion is disposed in the vicinity of the first contact portion 201R or the second contact portion 201L which comes into contact with the head of the user U. Thereby, the wearable device 100 can be supported with a well-balanced weight. In the present embodiment, the support portion 207 is disposed in the first frame extension portion 205R, and the wearable device (display device) 100 is attached thereto. However, a configuration may be adopted in which the support portion 207 is disposed in both the first frame extension portion 205R and the second frame extension portion 205L and in which a plurality of the wearable devices 100 are attached thereto. In this case, for example, the display device is attached to one frame extension portion and an imaging device is attached to the other frame extension portion. In this manner, the user can wear the wearable devices having different functions at the same time. In addition, the user may wear a sensor or a battery as the wearable device. The support member 200 for the wearable device (support portion 207) may be configured of the same housing as that of the wearable device 100 so as to be integrated with the wearable device 100. Alternatively, a separate configuration may be adopted in which the wearable device 100 is detachably attached to the support portion 207 by using a known technique such as a groove part for the wearable device 100 fitted to the support portion 207 or a screwing mechanism.

Figure 2:
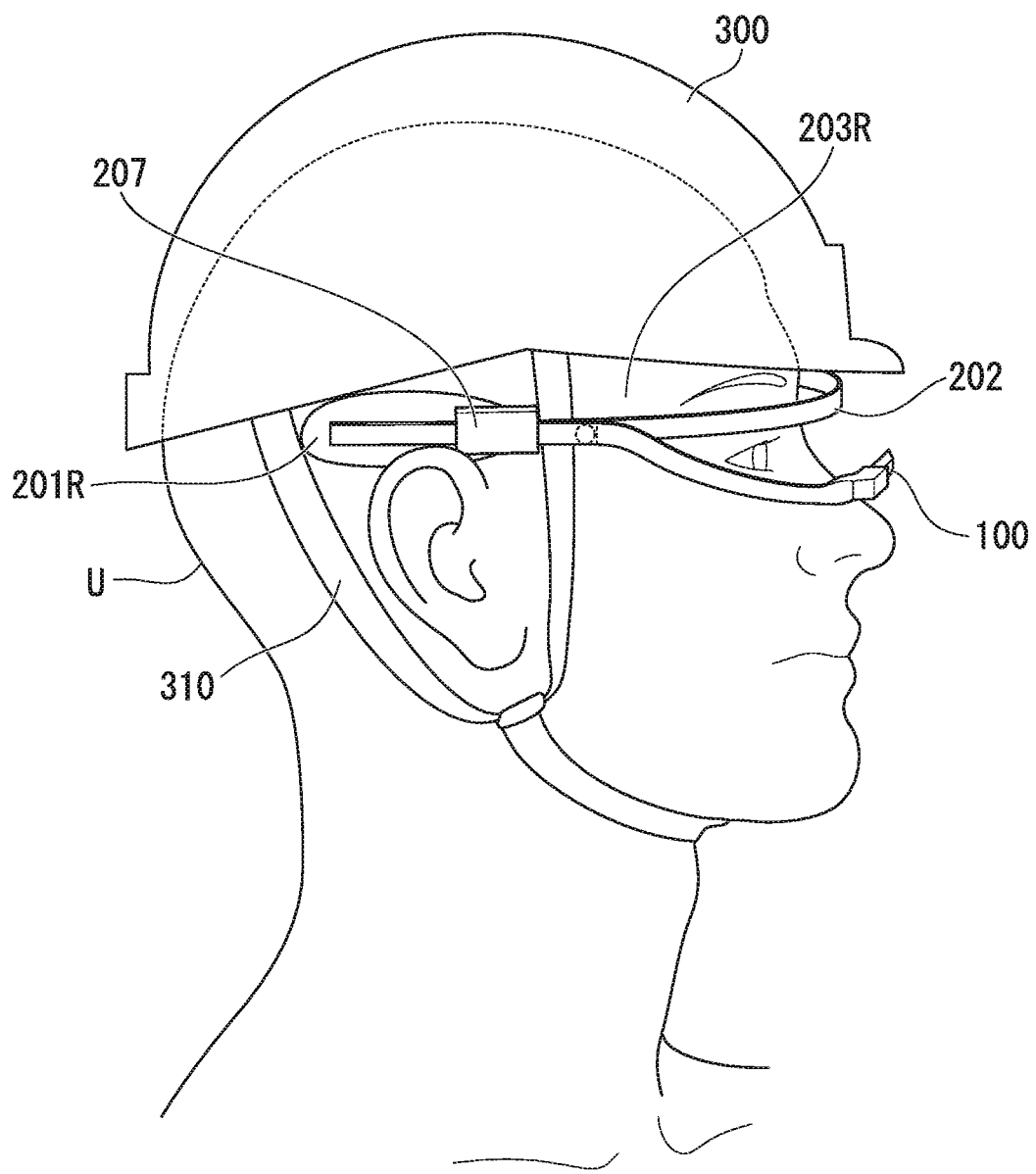
FIG. 2 is a side view illustrating a state where the user wears the support member for the wearable device according to the first embodiment and a helmet.
Figure 3:
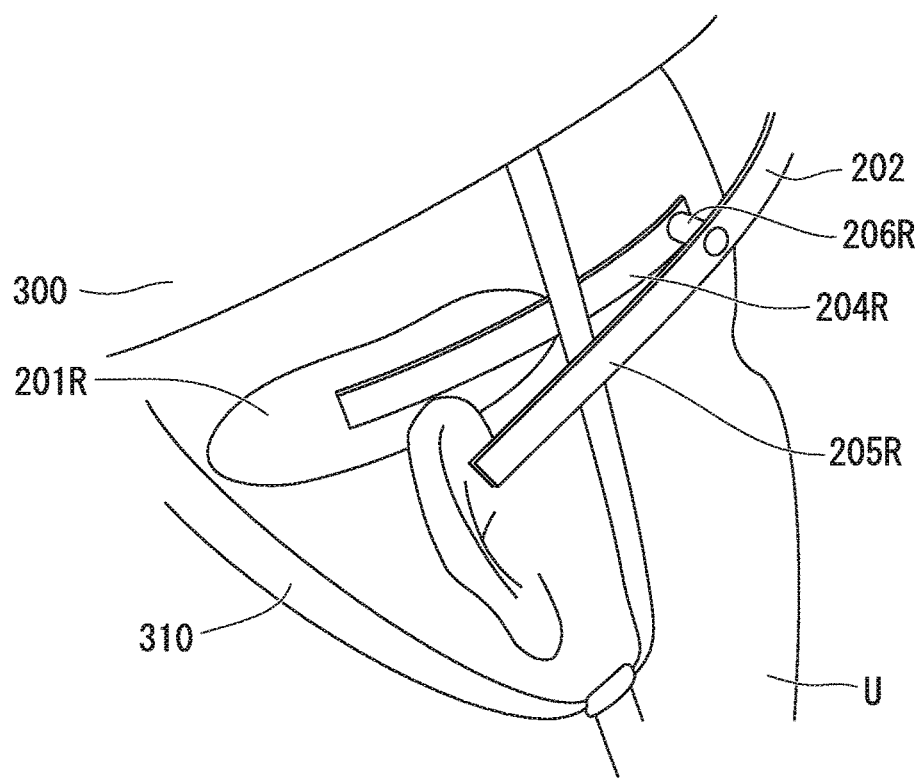
FIG. 3 is a perspective view of an enlarged connection portion of the support member for the wearable device according to the first embodiment.

FIG. 2 is a side view illustrating a state where the user U wears the support member 200 for the wearable device according to the first embodiment and a helmet 300. In general, the helmet 300 has an attached ear string 310 which extends from one temporal region of the user U to the opposite side temporal region through the front and rear portion of the ear and the chin of the user U. In addition, FIG. 3 is a perspective view of the enlarged first connection portion 203R of the support member 200 for the wearable device according to the first embodiment. FIG. 3 does not illustrate the support portion 207 and the wearable device 100.

In the first connection portion 203R of the support member 200 for the wearable device, in a top view, the first extension portion 204R and the first frame extension portion 205R are divided into two portions from the first dividing portion 206R. In addition, in a wearing state of the user U, the first dividing portion 206R is located forward from the ear of the user U. According to this configuration, a gap is generated between the first extension portion 204R and the first frame extension portion 205R in the rear of the first dividing portion 206R, thereby enabling the ear string 310 of the helmet 300 to pass through the gap. Accordingly, without interfering with the ear string 310 of the helmet 300, the user U can wear the support member 200 for the wearable device. The second connection portion 203L also has the same configuration. Therefore, it is possible to avoid the interference with the ear string 310 in the left temporal region of the user U.

Figure 4A:
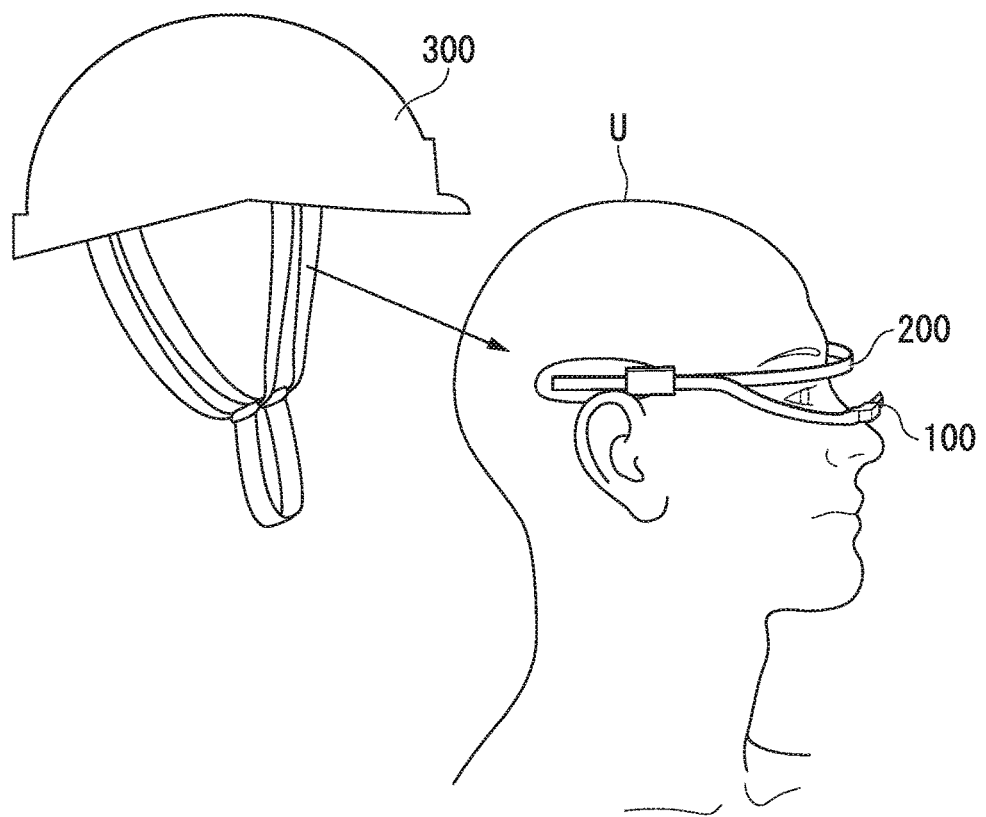
FIGS. 4A and 4B are views illustrating a wearing procedure of the support member for the wearable device according to the first embodiment and the helmet.
Figure 4B:
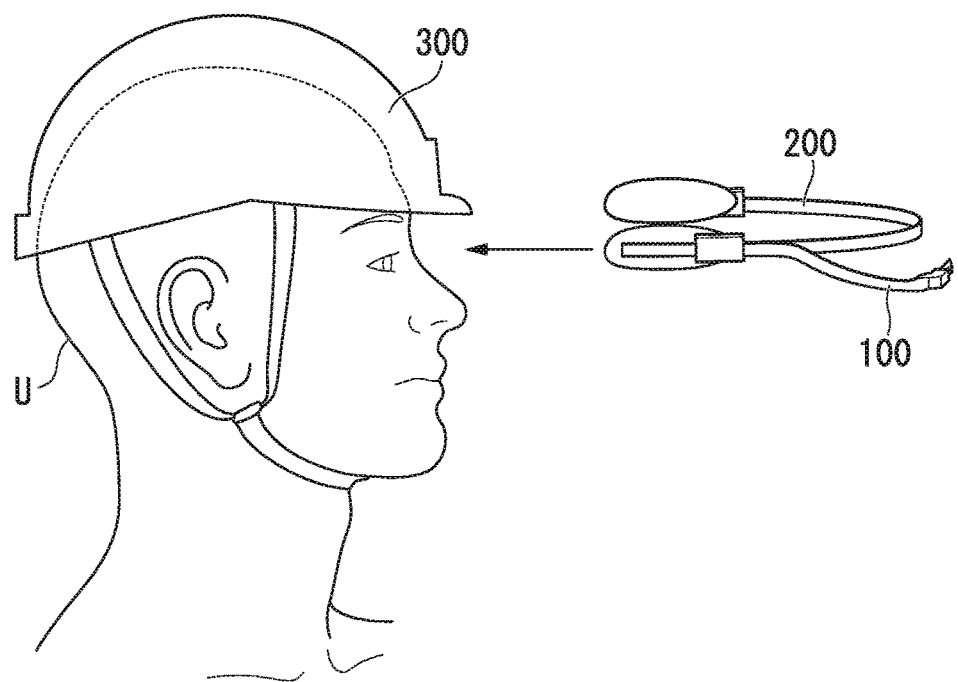

FIGS. 4A and 4B are views illustrating a wearing procedure of the support member 200 for the wearable device according to the first embodiment and the helmet 300. FIG. 4A is a view illustrating a case where the user U wears the helmet 300 after wearing the support member 200 for the wearable device. FIG. 4B is a view illustrating a case where the user U wears the support member 200 for the wearable device after wearing the helmet 300.

In FIG. 4A, the user U wears the support member 200 for the wearable device on the head. Thereafter, the user U wears the helmet 300, and causes the ear string 310 to pass through the gap formed by a structure in which the first extension portion 204R and the first frame extension portion 205R are divided into two portions in a top view. Similarly, the user U causes the ear string 310 to pass through the gap formed by a structure in which the second extension portion 204L and the second frame extension portion 205L are divided into two portions in a top view. In this way, the user U wears the support member 200 for the wearable device and the helmet 300, thereby enabling the user U to wear the helmet 300 after wearing the support member 200 for the wearable device.

In FIG. 4B, the user U wears the helmet 300 on the head. Thereafter, the user U wears the support member 200 for the wearable device on the temporal region so as to be introduced from the front. At this time, the user U wears the support member 200 for the wearable device so that the ear string 310 passes through the gap formed by the structure in which the first extension portion 204R and the first frame extension portion 205R are divided into two portions in a top view. Similarly, the user U wears the support member 200 for the wearable device so that the ear string 310 passes through the gap formed by the structure in which the second extension portion 204L and the second frame extension portion 205L are divided into two portions in a top view. In this way, the user U wears the support member 200 for the wearable device and the helmet 300, thereby enabling the user U to wear the support member 200 for the wearable device after wearing the helmet 300.

As described above, in a case where the support member 200 for the wearable device according to the first embodiment is used together with the helmet 300, the user U can wear the support member 200 for the wearable device afterward in a state where the user U wears the helmet 300 beforehand. Alternatively, the user U can wear the helmet 300 afterward in a state where the user U wears the support member 200 for the wearable device beforehand. That is, the user U may wear any one the support member 200 for the wearable device and the helmet 300 beforehand. When the user U wears the support member 200 for the wearable device, the user U does not feel any inconvenience in the wearing sequence.

Second Embodiment

Figure 5:
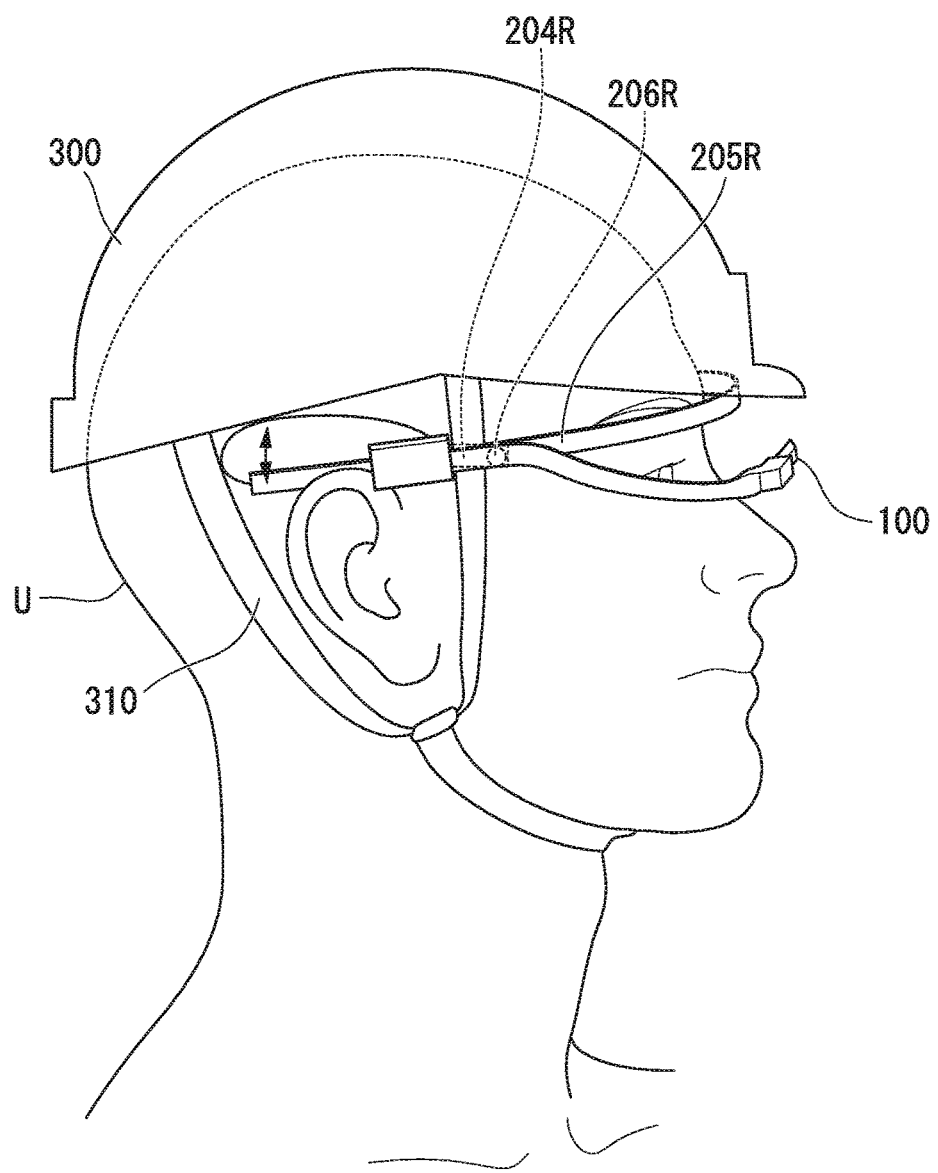
FIG. 5 is a side view illustrating a state where a user wears a support member for a wearable device according to a second embodiment and a helmet.

Next, a support member for a wearable device according to a second embodiment will be described. FIG. 5 is a side view illustrating a state where the user U wears the support member 200 for the wearable device according to the second embodiment and the helmet 300. The first connection portion 203R and the second connection portion 203L have a structure different from that of the support member 200 for the wearable device according to the first embodiment. In a side view, the first connection portion 203R of the support member for the wearable device according to the present embodiment is also divided into two portions of the first extension portion 204R and the first frame extension portion 205R from the first dividing portion 206R. Compared to the first embodiment, the frame portion 202 and the first frame extension portion 205R are disposed so as to tilt upward from the user U with respect to the first extension portion 204R. Similarly, in a side view, the second connection portion 203L is also divided into two portions of the second extension portion 204L and the second frame extension portion 205L from the second dividing portion 206L. Compared to the first embodiment, the frame portion 202 and the second frame extension portion 205L are disposed so as to tilt upward from the user U with respect to the second extension portion 204L.

Since the support member 200 for the wearable device according to the present embodiment has the above-described configuration, the frame portion 202 is disposed at a position which does not obstruct a view of the user U. In addition, in the first connection portion 203R, the first extension portion 204R and the first frame extension portion 205R are also divided into two portions from the first dividing portion 206R in the side view. Thereby, the ear string 310 is allowed to easily pass through the gap between the first extension portion 204R and the first frame extension portion 205R. This configuration is similarly applied to the left temporal region side of the user U in which the second connection portion 203L is disposed.

Third Embodiment

Figure 6:
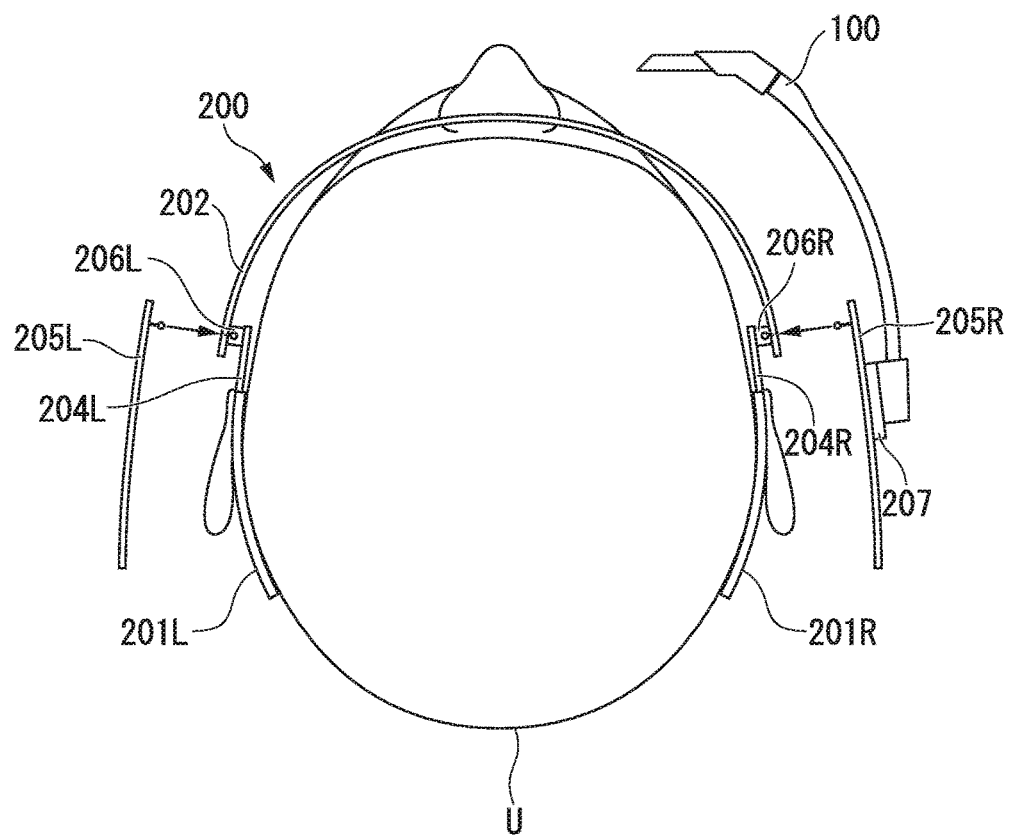
FIG. 6 is a top view for describing a support member for a wearable device according to a third embodiment.

Next, a support member for a wearable device according to a third embodiment will be described. FIG. 6 is a top view illustrating a state where the user U wears the support member 200 for the wearable device according to the third embodiment. The first frame extension portion 205R and the second frame extension portion 205L have a structure different from that of the support member 200 for the wearable device according to the first embodiment. The first frame extension portion 205R of the support member 200 for the wearable device according to the present embodiment is attachable to and detachable from the first dividing portion 206R. Similarly, the second frame extension portion 205L is attachable to and detachable from the second dividing portion 206L. According to this configuration, after wearing the support member 200 for the wearable device and the helmet 300, the user U can attach the first frame extension portion 205R and the second frame extension portion 205L. Therefore, the user U can wear the support member 200 for the wearable device and the helmet 300 so that the ear string of the helmet 300 is not disposed outside the first frame extension portion 205R and the second frame extension portion 205L.

Figure 7:
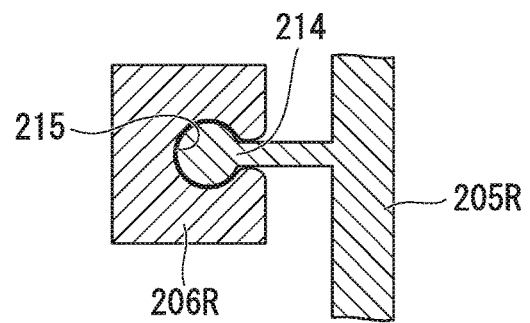
FIG. 7 is a sectional view for describing an attachment/detachment mechanism of the support member for the wearable device according to the third embodiment.

FIG. 7 is a sectional view illustrating an attachment/detachment mechanism of the first frame extension portion 205R and the first dividing portion 206R. The support portion 207 and the wearable device 100 are not illustrated. The first frame extension portion 205R has a cylindrical projection part 214 having a circular cross section, and the first dividing portion 206R has a groove part 215 having a circular cross section from the rear side end to the front of the user U. The projection part 214 of the first frame extension portion 205R is press-fitted into the groove part 215 of the first dividing portion 206R. Thereby, the first frame extension portion 205R (the support portion 207 and the wearable device 100) can be attached to the first dividing portion 206R (the support member 200 for the wearable device). Without being limited to a recess and a projection are fitted to each other or a groove, a method of attaching and detaching the first frame extension portion 205R and the first dividing portion 206R can employ a known technique such as a magnet, thereby enabling the attachment and detachment. A method of attaching and detaching the second frame extension portion 205L and the second dividing portion 206L can similarly employ the known technique, thereby enabling the attachment and detachment.

Fourth Embodiment

Figure 8:
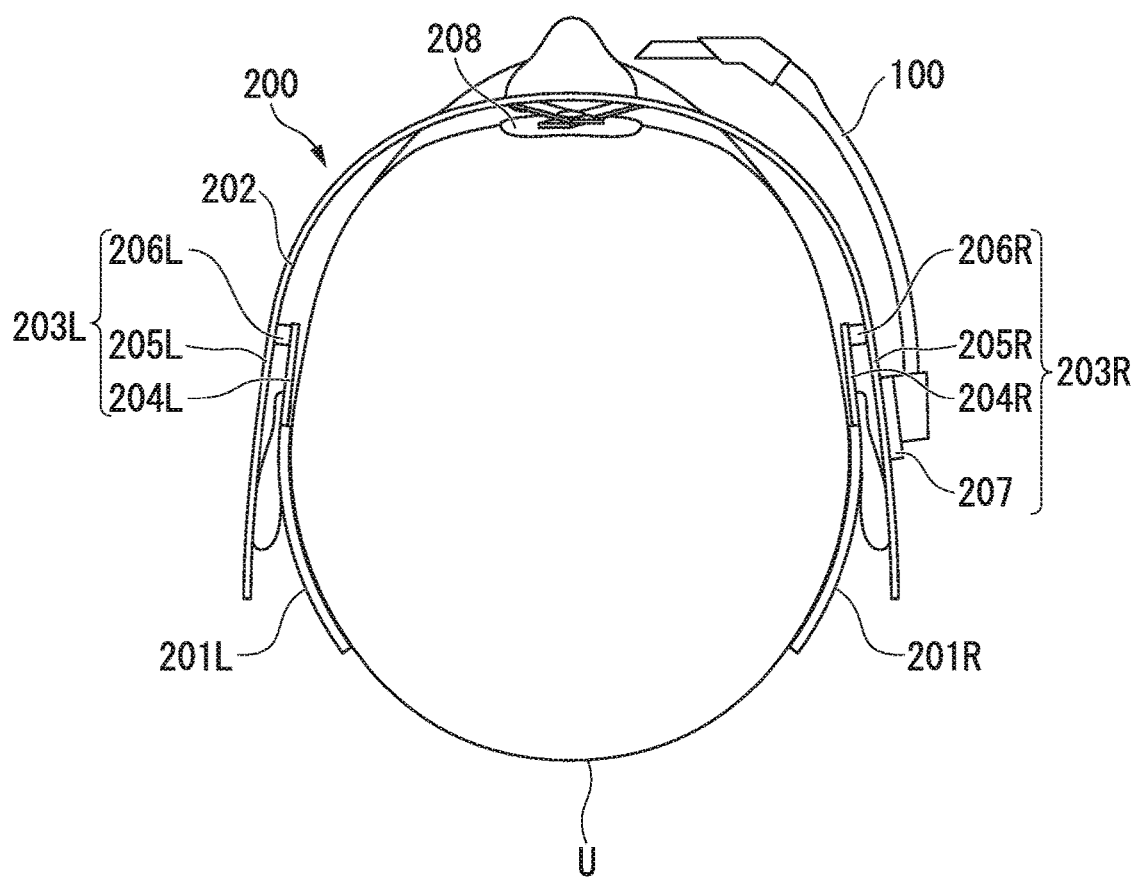
FIG. 8 is a top view illustrating a state where a user wears a support member for a wearable device according to a fourth embodiment.
Figure 9:
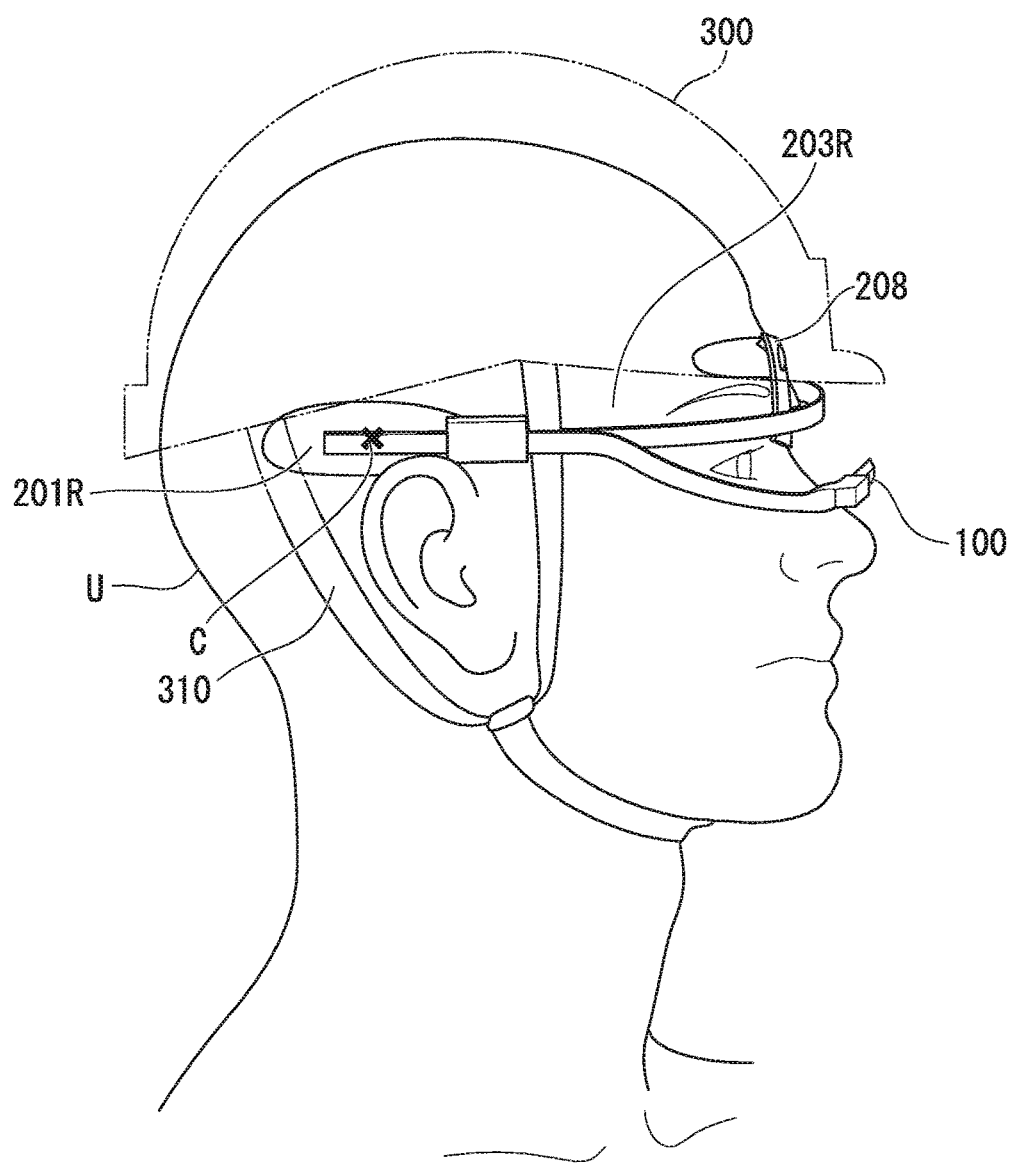
FIG. 9 is a side view illustrating a state where the user wears the support member for the wearable device according to the fourth embodiment and a helmet.

Next, a support member for a wearable device according to a fourth embodiment will be described. FIG. 8 is a top view illustrating a state where the user U wears the support member 200 for the wearable device according to the fourth embodiment. In addition, FIG. 9 is a side view illustrating a state where the user U wears the support member 200 for the wearable device according to the fourth embodiment and the helmet 300. The support member 200 for the wearable device according to the fourth embodiment has a third contact portion 208 which comes into contact with the frontal region of the user U. In addition, the first contact portion 201R and the second contact portion 201L are disposed at a position which comes into contact with the temporal region on the slightly rear side of the user U. Specifically, a center position C in a longitudinal direction (horizontal direction in FIG. 9) of the first contact portion 201R and the second contact portion 201L is located rearward from the ear of the user U. According to this configuration, more stable fixing is available in the forward and rearward direction of the user U.

Figure 10A:
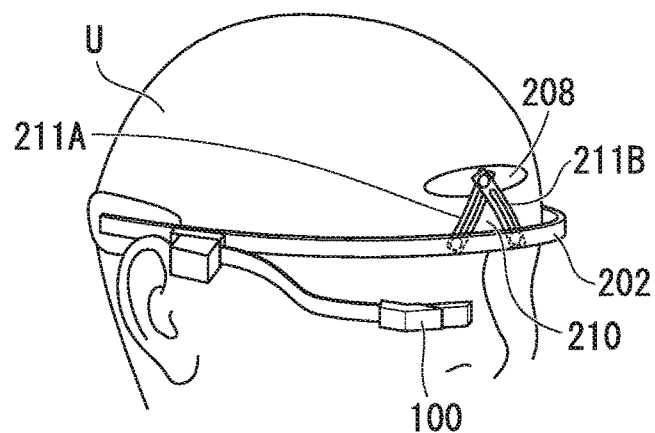
FIGS. 10A to 10C are views for describing a slide mechanism of a third contact portion.
Figure 10B:
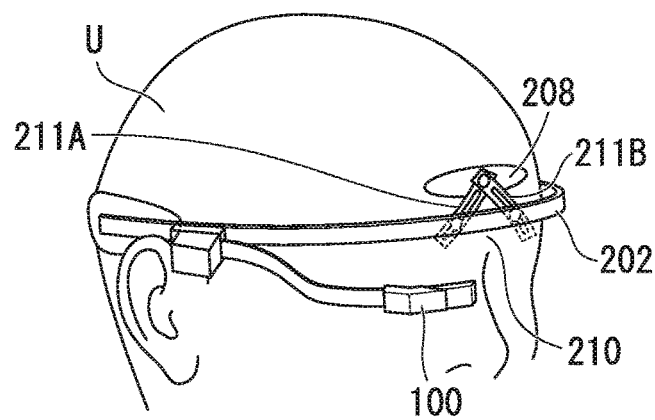
Figure 10C:
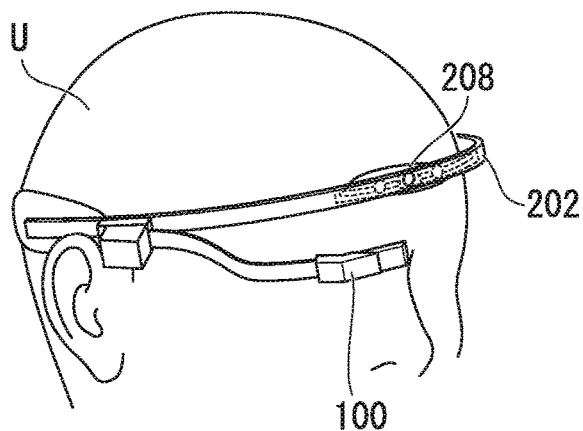
Figure 11:
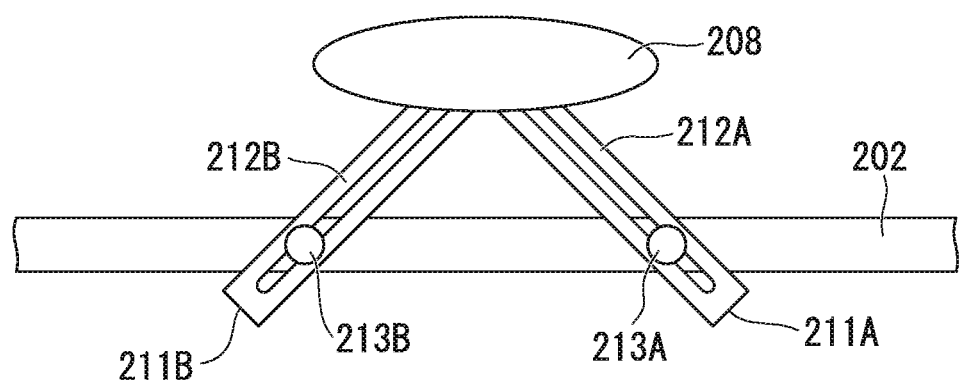
FIG. 11 is a plan view when the slide mechanism of the third contact portion is viewed from a user side.
Figure 12A:
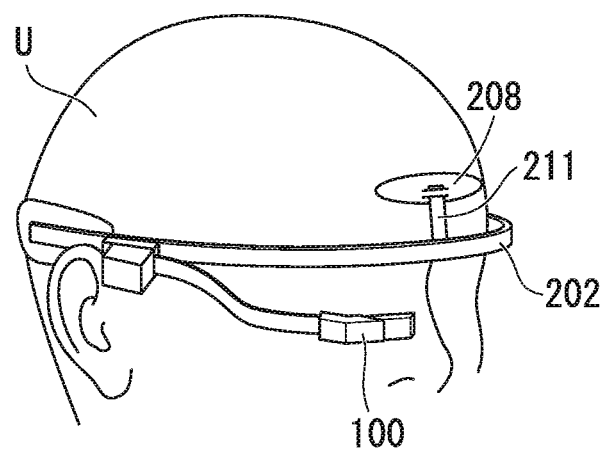
FIGS. 12A and 12B are views for describing a modified example of the slide mechanism of the third contact portion.
Figure 12B:
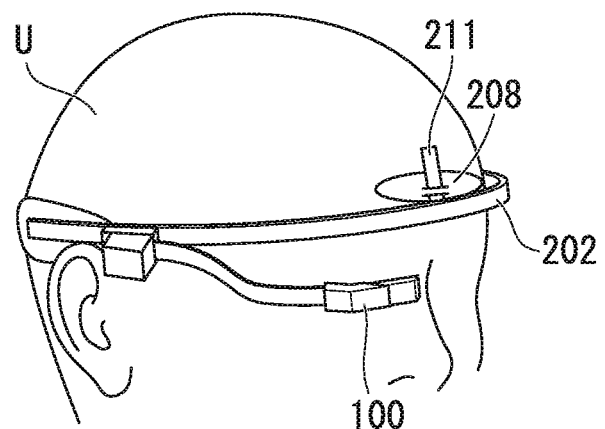

FIGS. 10A to 10C are views for describing a slide portion 210 of the third contact portion 208. In addition, FIG. 11 is a plan view when the slide portion 210 of the third contact portion 208 is viewed from the user U side. FIG. 10A is a view illustrating a state where the third contact portion 208 is disposed at a high position on the forehead of the user U. The third contact portion 208 is connected to the frame portion 202 via the slide portion 210 which is configured of two slide members 211A and 211B. In the two slide members 211A and 211B, one end is pivotally fixed to the third contact portion 208 by using a pin. In addition, the two slide members 211A and 211B have holes 212A and 212B along the longitudinal directions of the respective slide members. The holes 212A and 212B are attached to projection parts 213A and 213B of the frame portion 202. Thereby, the slide members 211A and 211B are attached thereto so as to be slidable. Here, if force acting downward from the user U is applied to the third contact portion 208, a connection point between the slide member and the frame portion 202 moves along the holes 212A and 212B of the slide members 211A and 211B. As a result, the third contact portion 208 moves from a position in FIG. 10A to a position in FIG. 10B. If the force acting downward from the user U is further applied to the third contact portion 208, the third contact portion 208 moves from the position in FIG. 10B to a position in FIG. 10C. In this way, the third contact portion 208 is fixed to the frame portion 202 so as to be slidable in the vertical direction. Accordingly, the third contact portion can be disposed at a position in accordance with a size or shape of a user's head. Therefore, the support member 200 for the wearable device can be stably fixed depending on individual differences. Without being limited to the configuration according to the present embodiment, a configuration of the slide portion may employ a slide mechanism using recesses and projections. In addition, in the present embodiment, the slide portion 210 is attached to the frame portion 202 so as to be slidable, thereby allowing the third contact portion 208 to be slidable in the vertical direction. However, as illustrated in FIGS. 12A and 12B, a mechanism may also be employed in which the third contact portion 208 slides with respect to the slide member 211 fixed to the frame portion 202. The mechanism of the slide portion 210 is slidable by using a known technique without being limited to the configuration according to the present embodiment.

Figure 13:
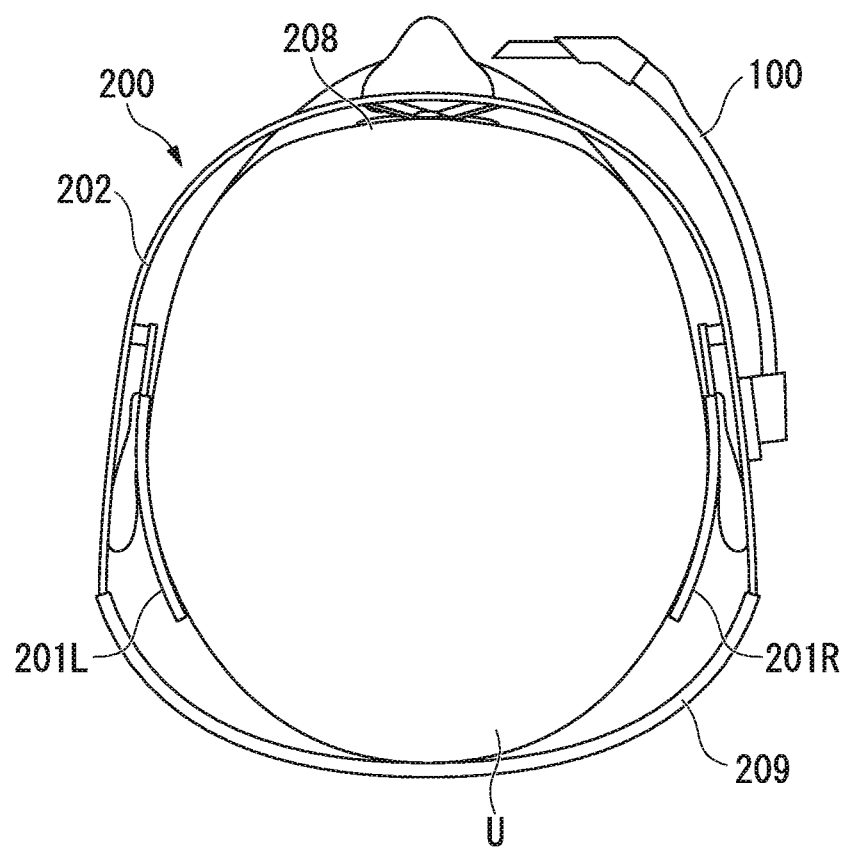
FIG. 13 is a top view illustrating a state where a user wears a support member for a wearable device according to a modified example of the fourth embodiment.
Figure 14:
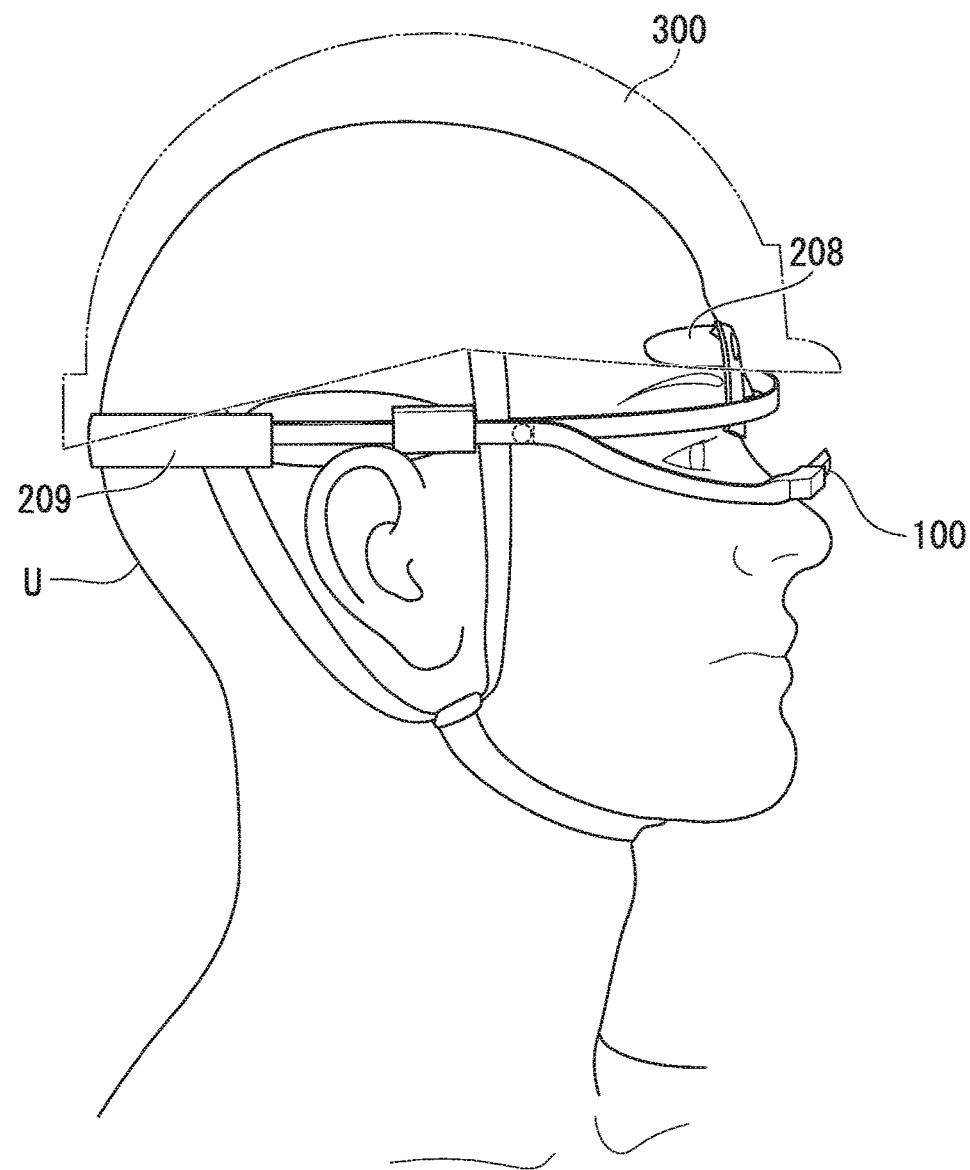
FIG. 14 is a side view illustrating a state where the user wears the support member for the wearable device according to the modified example of the fourth embodiment and a helmet.

Next, a modified example of the fourth embodiment will be described. FIG. 13 is a top view illustrating a state where the user U wears the support member 200 for the wearable device according to the modified example of the fourth embodiment. In addition, FIG. 14 is a side view illustrating a state where the user U wears the support member 200 for the wearable device according to the modified example of the fourth embodiment and the helmet 300. The modified example is different from the fourth embodiment in that the support member 200 for the wearable device includes an occipital region band 209 configured of an elastic material such as rubber.

The occipital region band 209 is attached to the first frame extension portion 205R and the second frame extension portion 205L and is brought into contact with the head along the occipital region of the user U. According to this configuration, the support member 200 for the wearable device can be more stably fixed to the head of the user U.

This modified example adopts a configuration in which the occipital region band 209 is attached to the first frame extension portion 205R and the second frame extension portion 205L. However, a configuration may be adopted in which the occipital region band 209 is attached to the first contact portion 201R and the second contact portion 201L. In addition, the occipital region band 209 or the configuration according to the present embodiment is also applicable to the first embodiment or the second embodiment.

As described above, without being limited to the above-described embodiments, the present invention can be modified or changed in various ways. For example, without being limited to an image display device, the wearable device 100 may be other wearable devices such as an imaging device and a music reproduction device. In addition, the support portion 207 may be slidable with respect to the first frame extension portion 205R or the second frame extension portion 205L. In addition, the support portion 207 may be pivotable around a connection point with the first frame extension portion 205R or the second frame extension portion 205L. In addition, in the support member for the wearable device, it is possible to adjust the layout of the wearable device 100 by allowing the support portion 207 to be slidable or pivotable. Furthermore, the above-described embodiments can be combined with each other. Various changes and modifications can be adopted within the scope not departing from the gist of the present invention. The present invention is not limited by the above description and is limited by only the appended claims.

What is claimed is:

1. A support member for a wearable device comprising:
    a first contact portion that is configured to come into contact with one of a right or a left temporal region of a head of a user;
    a second contact portion that is configured to come into contact with an other of the right or the left temporal region of the head;
    a frame portion that is configured to be interposed along a frontal region of the head of the user between the first contact portion and the second contact portion;
    a first connection portion that is configured to connect the first contact portion and the frame portion to each other; and
    a second connection portion that is configured to connect the second contact portion and the frame portion to each other,
    wherein the first connection portion has a first extension portion which is configured to extend toward a front of the user from the first contact portion along the one of the right or the left temporal region of the head of the user, and a first dividing portion which is configured to be located forward from an ear of the user and which is configured to connect the first extension portion and the frame portion to each other so as to form a first frame extension portion configured to extend toward a rear of the user from the frame portion, and in a top view, the first extension portion and the first frame extension portion each extend from the first dividing portion with the first extension portion being inside the first frame extension portion in a direction towards the head of the user so that the first extension portion and the first frame extension portion are offset from each other in the direction towards the head of the user as the first extension portion and the first frame extension portion extend from the first dividing portion toward the rear of the user,
    wherein the second connection portion has a second extension portion which is configured to extend toward the front of the user from the second contact portion along the other of the right or the left temporal region of the head of the user, and a second dividing portion which is configured to be located forward from the ear of the user and which is configured to connect the second extension portion and the frame portion to each other so as to form a second frame extension portion configured to extend toward the rear of the user from the frame portion, and in the top view, the second extension portion and the second frame extension portion each extend from the second dividing portion with the second extension portion being inside the second frame extension portion in the direction towards the head of the user so that the second extension portion and the second frame extension portion are offset from each other in the direction towards the head of the user as the second extension portion and the second frame extension portion extend from the second dividing portion toward the rear of the user, and
    wherein one or more of the first frame extension portion and the second frame extension portion includes a support portion which is configured to support a wearable device.

2. The support member for the wearable device according to claim 1,
    wherein in a side view, the first extension portion and the first frame extension portion each extend from the first dividing portion in the first connection portion, and
    wherein in the side view, the second extension portion and the second frame extension portion each extend from the second dividing portion in the second connection portion.

3. The support member for the wearable device according to claim 1,
    wherein the first frame extension portion is attachable to and detachable from the first dividing portion, and wherein the second frame extension portion is attachable to and detachable from the second dividing portion.

4. The support member for the wearable device according to claim 1, further comprising:
a third contact portion that is connected to the frame portion, and that is configured to come into contact with the frontal region of the head of the user.

5. The support member for the wearable device according to claim 1,
wherein in a state of wearing the support member, a center position in a longitudinal direction of each of the first contact portion and the second contact portion is configured to be located rearward from the ear of the user.

6. The support member for the wearable device according to claim 4,
wherein the third contact portion is movable in a vertical direction.

7. The support member for the wearable device according to claim 1, further comprising:
an occipital region band that is attached to the first frame extension portion and the second frame extension portion, and that is configured to come into contact with the head along an occipital region of the head of the user.

8. A support member for a wearable device comprising:
a first contact portion that is configured to come into contact with one of a right or a left temporal region of a head of a user;
a second contact portion that is configured to come into contact with an other of the right or the left temporal region of the head; and
a frame portion that is configured to be interposed along a frontal region of the head of the user between the first contact portion and the second contact portion,
wherein the frame portion has a first dividing portion and a second dividing portion on respective end sides, the first dividing portion and the second dividing portion each being configured to be located forward from an ear of the user, and in a top view, two extension portions extend from each of the first dividing portion and the second dividing portion,
wherein one of the extension portions extending from the first dividing portion along the one of the right or the left temporal region of the head of the user is connected to the first contact portion, and in the top view, the two extension portions extending from the first dividing portion are offset from each other in a direction towards the head of the user as the two extension portions extending from the first dividing portion extend from the first dividing portion toward a rear of the user,
wherein one of the extension portions extending from the second dividing portion along the other of the right or the left temporal region of the head of the user is connected to the second contact portion, and in the top view, the two extension portions extending from the second dividing portion are offset from each other in the direction towards the head of the user as the two extension portions extending from the second dividing portion extend from the second dividing portion toward the rear of the user, and
wherein one or more of an other one of the extension portions extending from the first dividing portion and an other one of the extension portions extending from the second dividing portion includes a support portion which is configured to support a wearable device.

9. The support member for the wearable device according to claim 1, wherein the wearable device is detachably connected to the support member for the wearable device.

* * * * *